May 23, 1961  J. W. PADGETT ET AL  2,985,538
WAX COATING COMPOSITION AND COATED ARTICLE
Filed Sept. 24, 1959  7 Sheets-Sheet 1

INVENTORS
JOHN W. PADGETT
SHERMAN T. VAN ESSELSTYN
BY
Kenyon & Kenyon
ATTORNEYS

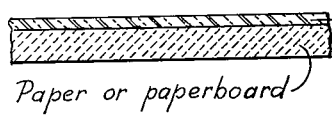
Paper or paperboard

{ Wax composition comprising a mixture of three hydrocarbon constituents, *A, B and C, the ratio by weight of A to B being within the range of 1:5 to 3:1 and the ratio of the combined weights of A and B to C being within the range of 1:5 to 2:1

\* The three constituents are as follows:

A consists of about 65-85% by weight of a non-straight chain paraffinic wax material having an average molecular weight in the range of about 550-750, a Saybolt Universal viscosity at 210°F of about 80-120 seconds, an oil content of up to about 3.0%, and a melting point by cooling curve of from about 160°F to about 180°F.

B is comprised of about 50-95% by weight of a straight chain paraffinic wax material and contains about 5-50% by weight of a non-straight chain paraffinic wax material and has an average molecular weight in the range of about 400-550, a Saybolt Universal viscosity at 180°F of about 45-65 seconds, an oil content of up to about 2.0%, and a melting point by cooling curve of from about 145°F to about 165°F.

C consists of at least about 90% by weight of a straight-chain paraffinic wax material and has an average molecular weight in the range of about 290-340, a Saybolt Universal viscosity of 180°F of about 37-41 seconds, an oil content of up to about 0.5%, and a melting point by cooling curve of from about 115°F to about 135°F.

FIG. 4

INVENTORS
JOHN W. PADGETT
SHERMAN T. VAN ESSELSTYN
BY
Kenyon & Kenyon
Attorneys

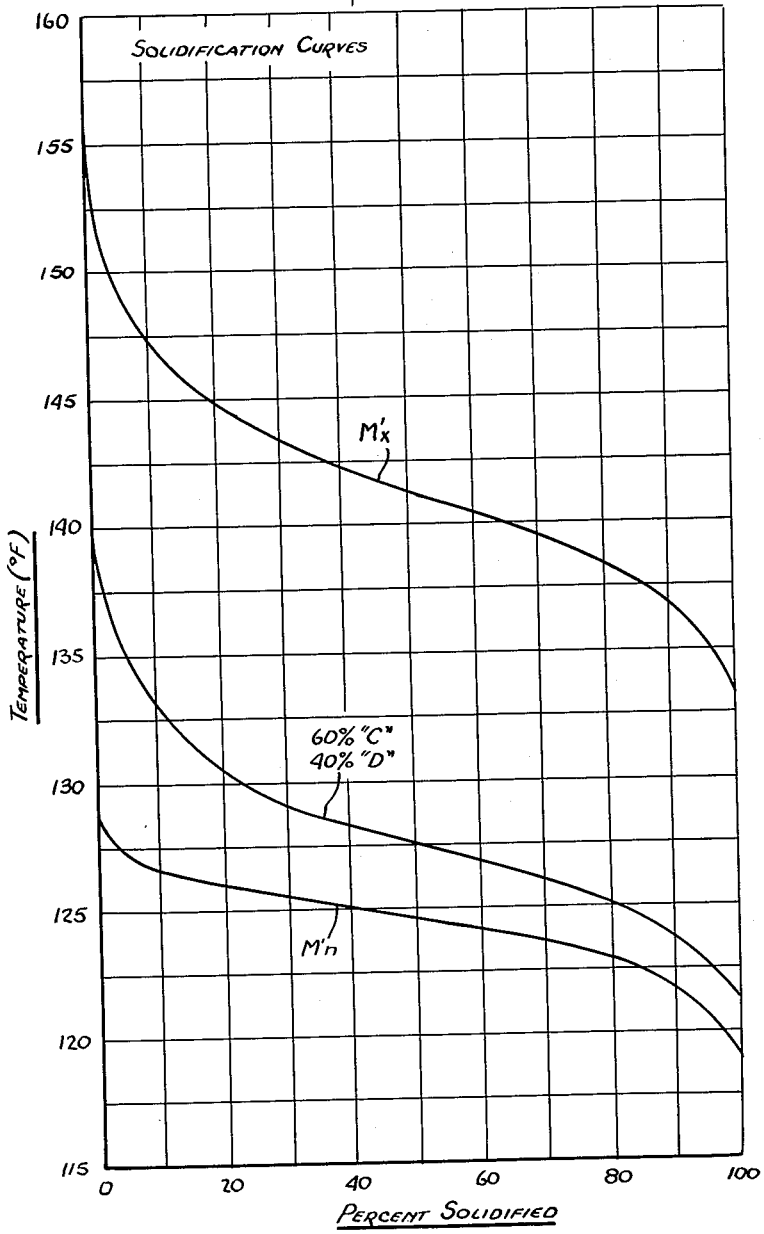

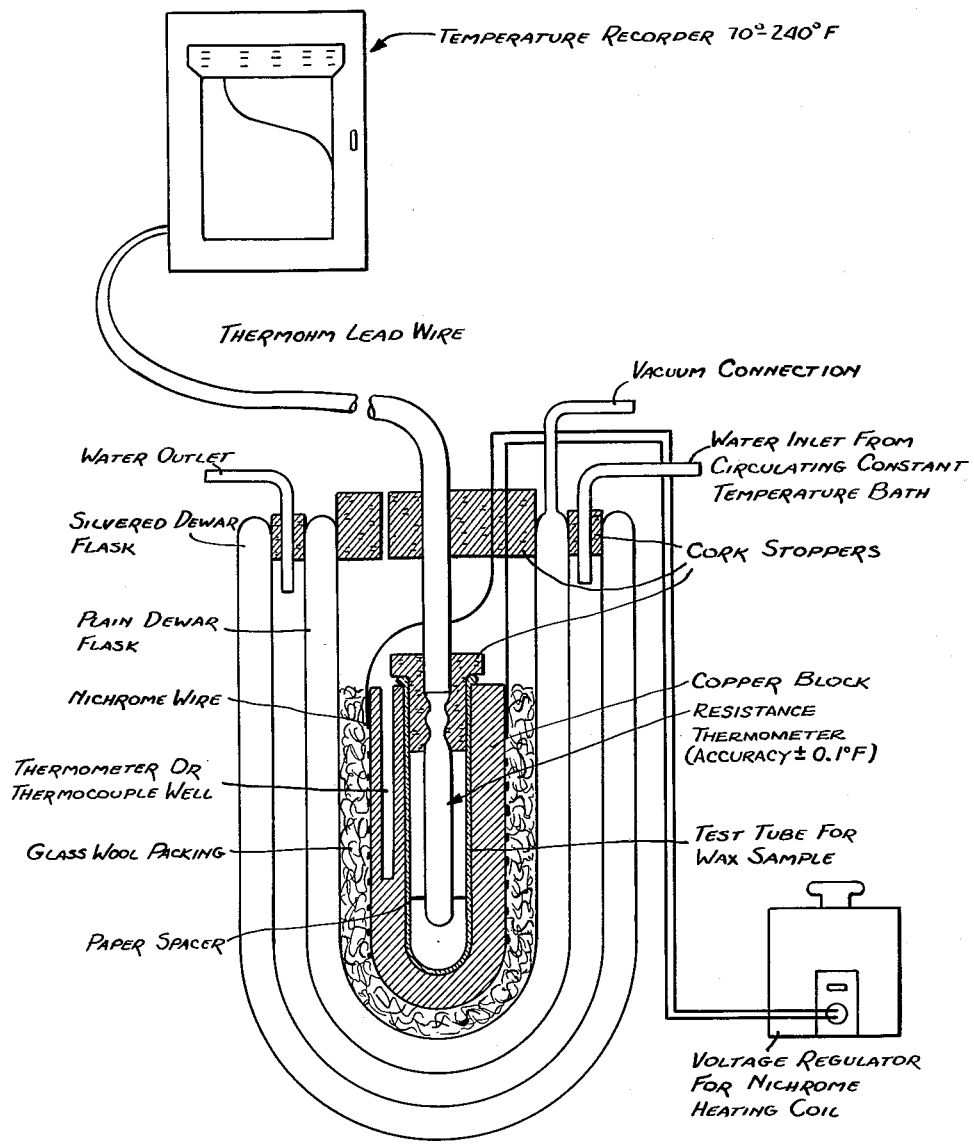

United States Patent Office 2,985,538
Patented May 23, 1961

2,985,538
WAX COATING COMPOSITION AND COATED ARTICLE
John W. Padgett, Round Top Road, Bernardsville, and Sherman T. Van Esselstyn, 55 Locust Drive, Morris Plains, N.J.
Filed Sept. 24, 1959, Ser. No. 842,166
16 Claims. (Cl. 106—270)

This invention relates to the impregnation and coating of paper containers and the like used in packaging wholly or partially liquid food products, and more particularly to a new and novel wax composition for coating such containers which provides the latter with superior shelf life and resistance to softening when in use, in addition to other highly desirable properties. This is a continuation-in-part of our application Serial No. 621,685, now abandoned.

In the packaging of citrus juices and partially or wholly liquid dairy products, such as milk, cottage cheese and the like, the practice of utilizing wax-coated paper or fiber board containers has become increasingly widespread in recent years, but several serious problems have been encountered rendering such practice unsatisfactory in many respects.

For example, heretofore the shelf life of such packaged liquids has been severely limited because of the distending or bulging of the sides of the containers as the contained liquid penetrated the wax coating and softened the paper. As a result, rigidity and strength of the container was severely impaired, leaks developed more readily, and the wax coating was more prone to flaking off into the product inside the container, particularly with rough handling. The resultant weakening of the structure of the container made subsequent handling without rupture and loss of contents difficult, if not impossible.

Another problem with prior coatings has been the difficulty in obtaining uniform and complete coverage of the entire area desired to be coated. Uncoated spots seriously decreased the product resistance of the container and considerably shortened the useful life thereof.

It is an object of the present invention to provide a coated container of paper or the like for packaging liquid food products, which has a tough, durable and liquid-resistant coating, capable of withstanding rougher handling, and which has an improved over-all appearance, higher gloss and smoother, plastic-like, finish.

Another object is to provide such a coated container having superior shelf life and resistance to softening and bulging in use at refrigeration temperatures, as well as at room temperature.

An additional object is to provide such a container having a coating which does not flake off into the food product contained therein.

A further object is to provide a coating composition with improved heat sealing characteristics for containers having "gable" type tops requiring a heat seal closure.

A further object is to provide a coating composition, with proper coating characteristics, which can be applied uniformly to a container without leaving uncoated areas.

All of the above objects are achieved without causing excessive drag of the carton or excessive wax build-up in machines during processing.

Other objects and features of the invention will become apparent in the following description and drawings, and in the appended claims.

Briefly, this invention resides in the use of a new and novel wax composition comprised of a unique combination of three hydrocarbon components or constituents, which, for the sake of simplicity, are designated herein as A, B and C respectively. Component A is a high molecular weight, high melting point, soft, tacky, plastic-like hydrocarbon material usually derived from petroleum residuums, and consisting predominantly of a mixture of non-straight chain saturated paraffin hydrocarbons (i.e. isoparaffins and naphthenes). Component B is a medium molecular weight, dry and only slightly tacky hydrocarbon material, usually derived from high boiling petroleum distillates. It consists predominantly of a mixture of saturated straight chain paraffins and contains a substantial proportion of saturated non-straight chain paraffin hydrocarbons. Component C is a low melting point straight chain paraffin hydrocarbon material, with only a minor proportion of non-straight chain paraffin hydrocarbons. The above use of "high," "medium" and "low" with reference to molecular weights and melting points is by way of relative comparison of the three components. Ranges of average values for these properties as well as others are set forth with particularity hereinbelow.

It has been discovered that when components A, B and C are mixed together within certain ranges of proportions a wax coating composition is obtained which has superior and hitherto unattainable properties particularly suitable for coating milk cartons and the like. It has been found that the weight ratio of $A:B$ should not be less than $1:5$ nor greater than $3:1$, and that the weight ratio of $(A+B):C$ should not be less than $1:5$ or greater than $2:1$ in order to obtain such properties.

Compositions formulated within the above specified ranges produce coatings having superior strength and toughness, rigidity, gloss and appearance, and provide coated cartons having a shelf life and resistance to softening in use at the usual refrigeration temperatures of around 40° F. far superior to any coating previously available.

In the drawings:

Fig. 6 is a drawing of the apparatus used in obtaining the data on which the curves shown in Fig. 5 are based.

Fig. 7 is a graph of a series of three melting point solidification curves of the composition of the present invention.

Fig. 8 is a drawing of the apparatus used to obtain the data on which the curves of Fig. 7 are based.

Figure 1:
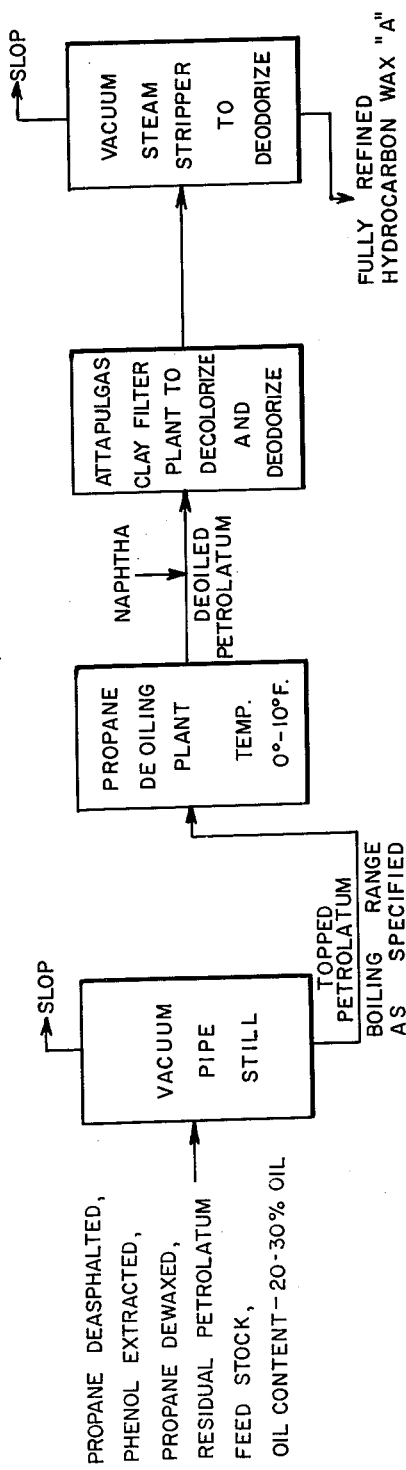
Fig. 1 is a process flow sheet showing the separate manufacturing steps for component A.

As shown in Fig. 1, component A may be manufactured from a propane deasphalted, phenol extracted, propane dewaxed, residual petrolatum feed stock having an oil content of about 20–30%. Such feed stock is topped in a vacuum pipe still at approximately 50 mm. Hg, to produce a vacuum bottom having the desired distillation analysis of not more than 20% distilling below 650° F. at 10 mm. Hg. Such topped petrolatum is passed through a propane deoiling plant at 0–10° F, The deoiled petrolatum is mixed with a naphtha diluent and decolorized and partially deodorized by filtering through attapulgus clay. The naphtha diluent is removed from the filtrate and the resultant wax hydrocarbon further deodorized in a vacuum steam stripper, thereby producing the fully refined hydrocarbon wax component A.

Figure 2:
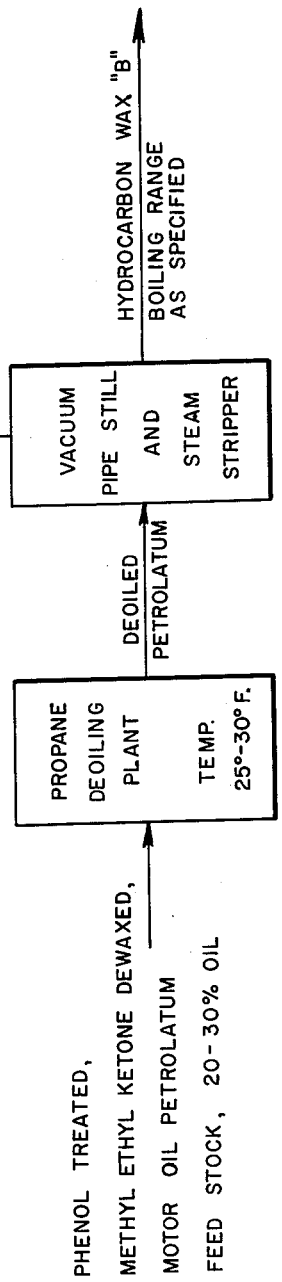
Fig. 2 is a process flow sheet showing the separate manufacturing steps for component B.

Component B may be obtained by passing a phenol treated, methyl ethyl ketone dewaxed, motor oil petrolatum feed stock having about a 20–30% oil content through a propane deoiling plant at approximately 25–30° F. as shown in Fig. 2, the deoiled product then being refined in a vacuum pipe still and steam stripper to produce hydrocarbon wax component B as a side fraction therefrom having a 10–90% boiling range of from 40–120° F. at 10 mm. Hg.

Figure 3:
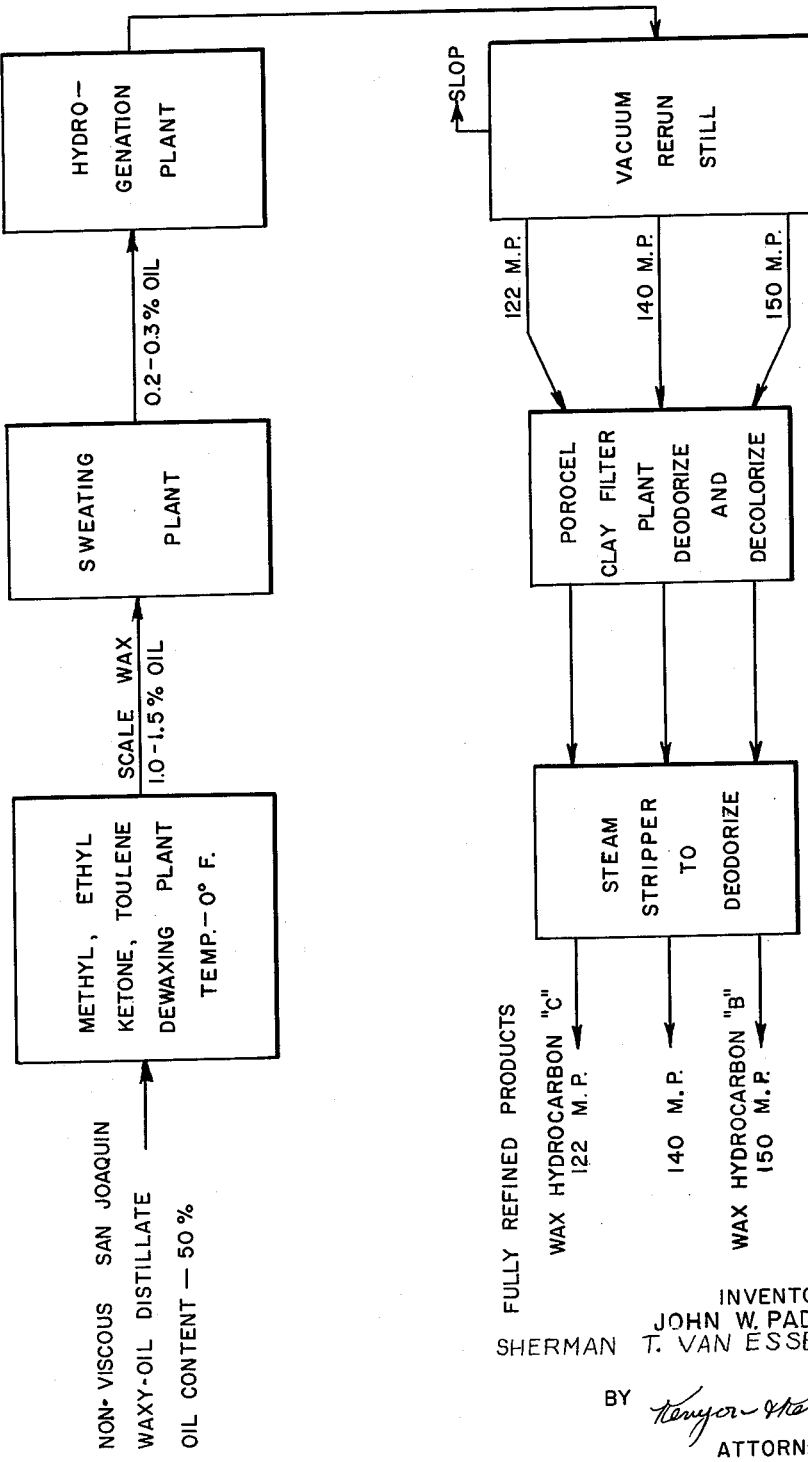
Fig. 3 is a process flow sheet showing the separate manufacturing steps for component C, and an alternate component B.

Component C, and an alternate component B, may be prepared as shown in the flow sheet of Fig. 3. A non-viscous San Joaquin waxy-oil distillate having an oil content of about 50% is treated in a methyl ethyl ketone, toluene dewaxing plant at about 0° F. and the scale wax (having about a 1.0–1.5% oil content) is subjected to a sweating operation to lower the oil content of the wax to about 0.2–0.3%. The latter wax is then hydrogenated and subsequently refined in a vacuum rerun still from which side fractions are produced having the desired melting points and boiling ranges as shown by way of example in Fig. 3. The selected fractions are then treated in a Porocel filter plant to partially deodorize and decolorize the product, and after treatment in a steam stripper to further deodorize it, the refined wax components are obtained as shown.

It is to be understood that the above methods are described by way of example only, and that other well known solvents, processes and crude oils could be utilized to produce the desired components A, B and C.

The desired physical properties for each of the separate components so produced are set forth in the following table:

ing" of the sample, a sufficient number of ebullators (boiling chips) are added to the flask and its contents, which are kept liquid by means of a heating mantle operated through a variable transformer.

The apparatus is assembled, the vacuum pump started, and the pressure adjusted to 10 millimeters of mercury by means of a Todd vacuum pressure regulator. Accurate readings of the pressure are obtained by means of the Todd Universal vacuum gauge, while the closed end manometer indicates the approximate pressure. After adjustment of the pressure, the sample is de-aerated for an interval of about 30 minutes. The temperature is then raised by increasing the voltage across the variable transformer, until the sample begins to distill. The rate of heating is adjusted such that the distillate (maintained at 180° F.) collects at the rate of 3–5 milliliters per minute. The distillation is continued until the maximum vapor temperature is reached, or until the sample shows evidence of cracking. At this point, the distillation is considered to be complete.

The temperature is recorded at the instant the first drop of distillate falls from the lower end of the condenser tube. This is considered to be the initial boiling point. Over the initial 10 percent, temperature is recorded for each 2 percent distilled. Thereafter, temperature readings are made for each 5 percent distilled, until 90 percent of the sample has distilled. Temperature readings are then taken for each 2 percent distilled. In most cases, the distillation is complete before 90 percent of distillate is collected.

A boiling point curve may be established by plotting the temperature in degrees Fahrenheit as the ordinate against the volume percent distilled as the abscissa.

The apparatus used for the determination of melting point referred to above is shown in Fig. 8. The method used is as follows:

5.0 grams of the molten sample are introduced into the sample holding test tube and the thermohm inserted

TABLE I
*Type analysis*

|  | "A" | | "B" | | "C" | |
| --- | --- | --- | --- | --- | --- | --- |
|  | Typical Example | Range | Typical Example | Range | Typical Example | Range |
| Composition, percent straight chain paraffin hydrocarbon | 25 | 15–35 | 70 | 50–95 | 99 | 90–100 |
| Molecular weight | 660 | 550–750 | 450 | 400–550 | 315 | 290–340 |
| Boiling point range between 10–90% distilled at 10 mm. Hg (° F.) | [1]12–172 | [1]20–180 | 80–153 | 40–120 / 145–165 | 28–124 | [3]20–100,[4]20–120 / 115–135 |
| Melting point by cooling curve (° F.) | 172 | 150–180 | 153 | 145–165 | 124 | 115–135 |
| 10–90% Melting point range by differential thermal analysis of cooling curve (° F.) | 18 | 15–30 | 9 | 6–14 | -4 | 2–10 |
| ASTM congealing point (° F.) | 170 | 150–180 | 153 | 145–165 | 124 | 115–135 |
| Specific gravity at 180° F. | 0.8153 |  | 0.7835 |  | 0.7605 |  |
| Saybolt universal viscosity (SUS) at— |  |  |  |  |  |  |
| 180° F. |  |  |  |  |  |  |
| 210° F. | 104 | 80–120 | 55 | 45–65 | 39 | 37–41 |
| ASTM oil content (percent) | 1.7 | [2]3.0 | 1.5 | [2]2.0 | 0.2 | [2]0.5 |
| ASTM tensile strength using Dow molds (p.s.i.) at — |  |  |  |  |  |  |
| 40° F. | 251 |  | 238 |  | 130 |  |
| 73° F. | 171 |  | 308 |  | 109 |  |
| Tensile energy (inch-pounds per square inch) at 40° F. | 4.38 |  | 3.65 |  | .425 |  |
| Bending energy [5] (inch-pounds) at 40° F. | 35.0 |  | 2.1 |  | <1.0 |  |
| Consistometer hardness (Abraham units) at— |  |  |  |  |  |  |
| 90° F. | 25.5 |  | 35.0 |  | 29.0 |  |
| 40° F. | 63.0 |  | 59.5 |  | 57.5 |  |

[1] Percent distilled below 650° F.
[2] Maximum.
[3] For melting points less than 130° F.
[4] For melting points greater than 130° F.
[5] Bending energy was determined by measuring the product of load times deflection at a constant rate of deflection of ½" per minute required to break a specimen measuring 3" x 1" x 50 mils placed on 2 fulcrums 2" apart and loaded midway between such fulcrums.

The apparatus used for the distillation referred to above is shown in Fig. 6. The method employed (ASTM designation D158–59 modified as indicated below) is as follows:

100 milliliters (measured at 180° F.) of the sample are charged into the distilling flask. To prevent "bumpinto the liquid sample. The thermohm is kept centered in the test tube by means of paper spacers which are ½ inch in diameter, contain a ¼ inch center hole, and are notched to prevent entrapment of air during insertion. A cork stopper is used to prevent contact between the thermohm and the bottom of the test tube.

The sample container, along with the thermohm, is inserted into the cavity of the copper block, and the cork cover placed in the inner Dewar flask. Heat is applied to the copper block and wax sample by increasing the voltage across the variable transformer until both have attained a temperature of about 220° F. as indicated by recorders. The temperature of the water bath is adjusted to 32±0.2° F. by the use of ice.

After completion of these preliminary operations, and when the copper block and wax sample have been in equilibrium for a minimum of 3 minutes, the variable transformer is turned off and the sample allowed to cool to about 70° F. During the determination, the rate of cooling is controlled by the insulation and the water bath temperature.

A melting point curve may then be established by replotting the derivative of the recorded curves. Temperature is plotted as the ordinate against the accumulated percent solidifying as the abscissa.

EXAMPLE

A coating composition was compounded by thoroughly mixing forty parts by weight of component A and sixty parts by weight of component B and then mixing sixty parts by weight of the latter mixture with forty parts by weight of component C. The physical properties of the composition used are shown in column 1 of Table II (which also includes other typical compositions in columns 2 and 3):

TABLE II

*Blend composition analysis*

COMPOSITION

| | 1 | 2 | 3 |
|---|---|---|---|
| | 40% "C" 60% "D"[1] | 60% "C" 40% "D" | 80% "C" 20% "D" |
| ASTM congealing point (° F) | 144 | 137 | 125 |
| Saybolt universal viscosity at 180° F. (SUS) | 54.5 | 47 | 42.5 |
| ASTM tensile strength using Dow molds at 40° F. (p.s.i.) | 277 | 447 | 380 |
| Tensile energy (inch-pounds per inch²) at 40° F. | 3.75 | 5.0 | 3.12 |
| Bending energy (inch-pounds) at 40° F. | 13.6 | 6.0 | 2.2 |
| Consistometer hardness (Abraham units) at— | | | |
| 90° F | 31.0 | 31.5 | 32.5 |
| 40° F | 70.0 | 76.2 | 78.0 |
| Color ASTM union colorimeter | 1½− | 1½− | 1+ |

[1] D=40% A+60% B.

Figure 5:
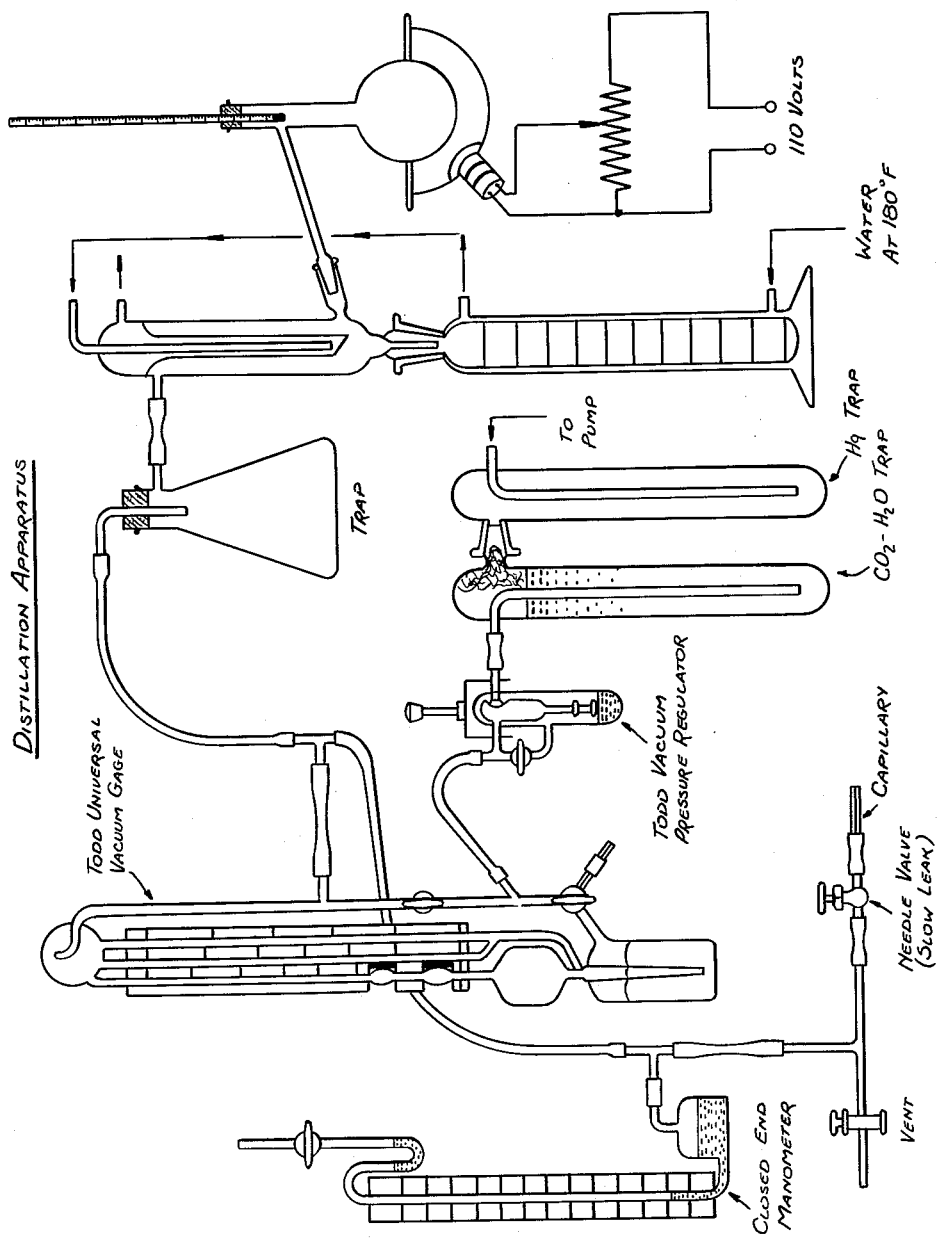
Fig. 5 is a graph of boiling point distillation curves of the composition of the present invention.

A boiling point curve and a melting point curve were established for the composition of column 2, which curves are indicated in Figs. 5 and 7 respectively. This composition is an average composition within our invention.

Tests were run with the above composition of column 1 coating standard type one quart milk cartons on a commercial machine. Approximately one hundred cartons were coated and were divided into roughly four equal groups for the following tests. Two such groups were filled with orange juice and a 1% lactic acid solution, respectively, and stored at room temperature for a period of several days. The other two groups were filled with orange juice and milk respectively, and placed in refrigerated (40° F.) storage.

Each day during such period the "bulge" of the cartons was measured ("bulge" is expressed in 1/32 inch increases in lateral dimensions of the carton) and at the end of such period the weight of water in pounds absorbed by the cartons was measured and the weight in pounds per thousand cartons calculated by extrapolation. A "drop test" was conducted on certain of the refrigerated cartons shortly after filling and after the liquid contents substantially reached the 40° F. temperature. The test was carried out by repeatedly dropping the carton 6 inches down a vertically guided track onto a wooden block with four raised corners corresponding to the four bottom corners of the carton. The number of drops required for failure or rupture as indicated by the first evidence of a leak of the carton were observed. In addition, measurements were made of the weight of free wax inside the container after 15 drops and a figure tabulated on the basis of pounds of wax flake per thousand cartons. A typical petroleum wax was run as a control and similar tests and measurements were made on cartons coated with such material.

The data for the above tests are tabulated in Table III:

TABLE III

A. *Room temperature storage*

ORANGE JUICE

| | Bulge (1/32 inch) | | | | $H_2O$ absorbed, pounds per 1,000 cartons |
|---|---|---|---|---|---|
| | 1 day | 2 days | 3 days | 4 days | |
| Control | 7.0 | 9.8 | 12.5 | 13.2 | 14.2 |
| New material | 6.0 | 7.0 | 8.0 | 8.4 | 8.5 |

1% LACTIC ACID

| | 1 day | 2 days | 3 days | 4 days | |
|---|---|---|---|---|---|
| Control | 8.5 | 10.6 | 11.3 | | 9.3 |
| New material | 7.0 | 8.0 | 8.0 | | 6.6 |

B. *Refrigerated storage (40° F.)*

ORANGE JUICE

| | Bulge (1/32 inch) | | $H_2O$ absorbed, pounds per 1,000 cartons | Drop Test at 40° F., number of drops causing failure | Flaking after 15 drops, pounds per 1,000 cartons |
|---|---|---|---|---|---|
| | 3 days | 7 days | | | |
| Control | 6.7 | 8.4 | 9.0 | | |
| New material | 5.0 | 5.1 | 5.8 | | |

MILK

| Control | 6.5 | 8.0 | 7.1 | 4.9 | 0.86 |
|---|---|---|---|---|---|
| New material | 4.6 | 5.4 | 5.6 | 9.2 | 0.09 |

It will be noted in Table III that the coating of the present invention was superior in all respects to the prior wax coating, both at room temperature and at 40° F. The "bulge" was much less for the new material and maintained a fairly uniform level over the test period, whereas for the old material at room temperature, for example, the "bulge" nearly doubled over the four day period on the orange juice cartons. Cartons coated with the new material absorbed considerably less water in all services, gave about 100% better performance in the drop test and the new coating material flaked off one-tenth as much as the old. Such results reflect the outstanding character of the present invention and the great promise it offers to the packaging industry.

It has been found that in order to obtain all of the advantageous properties shown in the above example, certain physical properties of the final coating composition should have values as shown in Table IV:

TABLE IV

ASTM congealing point (° F.) _____ Not over 145.0.
Saybolt viscosity at 180° F. (SUS) __ Not over 55.
Tensile strength at 40° F. (p.s.i.) __ Not below 260.
Tensile energy at 40° F. (inch-pounds) (per square inch) _____ Not below 3.0.
Consistometer hardness (Abraham units):
 At 90° F _____ 22–35.
 At 40° F _____ 60–80.
Color-ASTM union colorimeter _____ Not over 1½.
ASTM oil content, percent _____ Not over 0.8.

Although not a physical property, oil content is included herein. It will also be understood that color is, to a degree, a matter of preference.

As previously mentioned, additional requirements exist with respect to the proportions in which the three components should be blended. The weight ratio of $A:B$ should fall within the range of from 1:5 to 3:1, and the weight ratio of $(A+B):C$ should fall within the range of from 1:5 to 2:1 in order to obtain performance characteristics similar to those shown in the above example. If the ratio of $(A+B):C$ of 2:1 is exceeded, it has been found that the coating composition will cause excessive wax build-up in the machines during processing of the cartons to such an extent that it will require a shut-down of the operation. Furthermore, any cartons coated with such a composition will not give the required performance in service under the normal conditions of handling and use.

Using compositions with ratios of $(A+B):C$ of less than 1:5 will not provide the superior properties of the present invention, but rather will give coatings exhibiting the undesirable properties of the prior art compositions sought to be avoided by this invention.

Thus in summary it can be seen that below the 1:5 ratio, the undesirability of the composition resides in poor performance of the coating in use on the coated carton, whereas above the 2:1 ratio the undesirability lies in both poor operational behavior of the coating in the processing machinery, as well as its poor performance in use.

A ready means of determining whether one has obtained a coating composition within our invention, and one which will provide all of the necessary physical properties and performance characteristics, is by establishing boiling point distillation and melting point solidification curves for the composition in question in accordance with the methods described above, and then determining both the ASTM oil content and the consistometer hardness. We have found that compositions within our invention and embodying the performance characteristics thereof will have a boiling point distillation curve falling within the area defined by curves $Mx$ and $Mn$ of Fig. 5 and including curves $Mx$ and $Mn$ themselves, and a melting point solidification curve falling in the area between curves $M'x$ and $M'n$ of Fig. 7 and including curves $M'x$ and $M'n$ themselves. For example, the composition of column 2 in Table II exhibits the boiling point distillation curve shown in Fig. 5 and the melting point solidification curve shown in Fig. 7, both of these curves being within the limits stated. We have further found that the wax compositions of our invention will comprise from about 46% to about 97% straight chain paraffinic wax, the remainder being non-straight chain paraffinic wax, as calculated from the use of the components referred to in Table I in the ratios set forth above.

Such compositions should also have an ASTM oil content of not over 0.8%, and a consistometer hardness, measured in Abraham units, of between 22-35 at 90° F. and 60-80 at 40° F. Any coating composition having the requisite boiling point distillation and melting point solidification curves, as well as the indicated hardness and oil content, will have the requisite congealing point, viscosity, tensile strength and tensile energy, and will satisfactorily perform. In addition, we would prefer that the composition have a color which is not over 1½ on an ASTM union colorimeter.

In addition to its other previously enumerated advantages, the coating composition of the present invention has been found to have excellent heat sealing characteristics, especially on containers having "gable" type tops requiring a heatseal closure. It will be understood by those skilled in this art that minor amounts of wax additives, such as antioxidants, defoamers, extenders, polyisobutylene, butyl rubber, polyethylene and others, may be added to our coating composition for their known effects without departing from our invention. Thus, the term "consisting essentially of" as used in the claims means that the composition is made up almost entirely of the ingredients recited and these ingredients are the main and characterizing ones, but this expression does not exclude the presence of minor amounts of other ingredients which do not change the essential character of the composition.

The coating operation can be briefly described as follows: The three components A, B and C are mixed together and blended in the desired proportions as described above, and a bath prepared containing such blend at temperatures ranging from 160 to 195° F. The cartons or containers are fabricated in any standard well-known fashion from paper or other fibrous material and then waxed by dipping into the bath. The cartons are then held in a draining position to allow the excess wax to drain off; in some cases where, for example, a thicker coating is desired, they are dipped a second time. Then the coating is solidified, for example, by passing through a refrigerated chamber at about 40° F. or dipped into water held at 36°–66° F. To assist in such solidification, prior to or during passage through the refrigerated air chamber the bottom of the carton can be immersed in water at 36°–66° F., to a depth ranging from ¼ inch to ½ inch.

Figure 4:
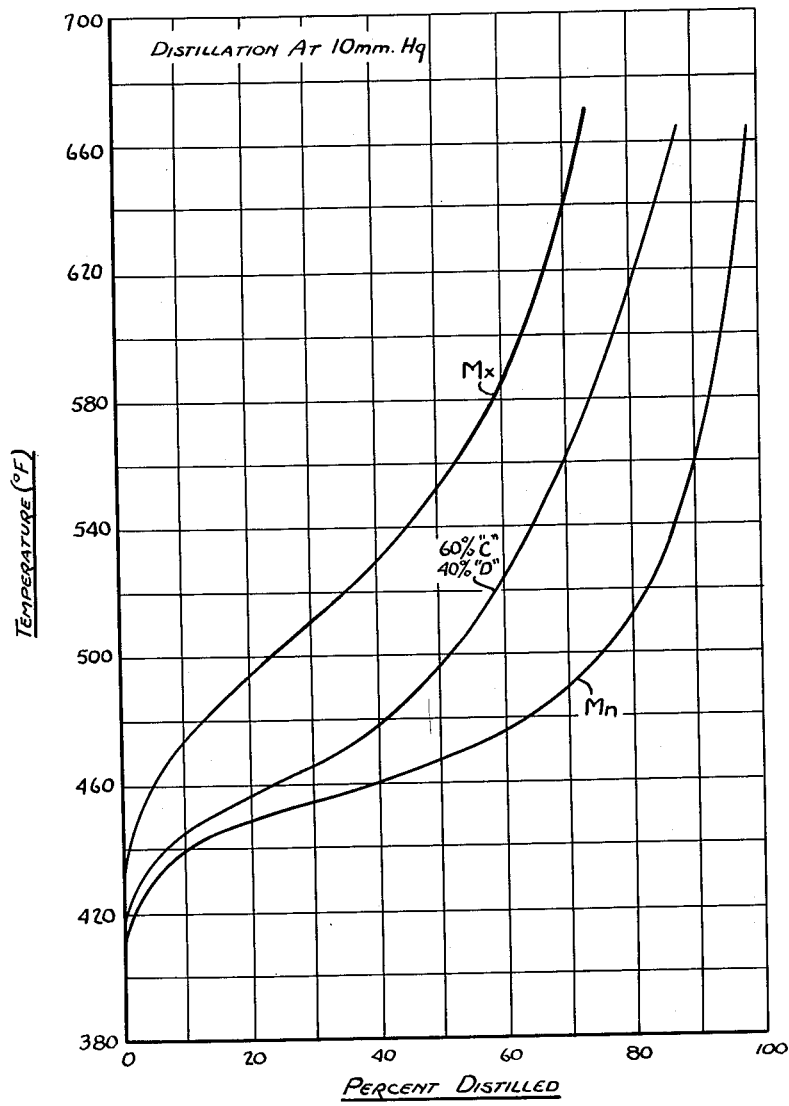
Fig. 4 is a diagrammatic enlarged sectional view of a portion of an article coated with the composition of the present invention.

The above method gives a coating of uniform thickness which leaves no uncoated spots or areas. A typical section of the coated container is shown in Fig. 4, wherein the wax coating is designated by reference number 10 and the paper or other fibrous material is designated by the reference number 11. Existing machinery and equipment can be used with this coating material. No special apparatus is required for its use.

While only one embodiment of this invention has been described in this application, it is recognized that certain changes will become apparent to those skilled in the art without departing from the spirit and scope of this invention.

We claim:

1. A wax composition consisting essentially of a mixture of three hydrocarbon constituents, the first of which consists of about 65–85% by weight of a non-straight chain paraffinic wax and has an average molecular weight in the range of about 550–750, a Saybolt Universal viscosity at 210° F. of about 80–120 seconds, an oil content of up to about 3.0%, and a melting point by cooling curve of from about 150° F. to about 180° F.; the second of said constituents being comprised of about 50–95% by weight of a straight chain paraffinic wax and containing about 5–50% by weight of a non-straight chain paraffinic wax material and having an average molecular weight in the range of about 400–550, a Saybolt Universal viscosity at 180° F. of about 45–65 seconds, an oil content of up to about 2.0%, and a melting point by cooling curve of from about 145° F. to about 165° F.; and the third of said constituents consisting of at least about 90% by weight of a straight-chain paraffinic wax and having an average molecular weight in the range of about 290–340, a Saybolt Universal viscosity at 180° F. of about 37–41 seconds, an oil content of up to about 0.5%, and a melting point by cooling curve of from about 115° F. to about 135° F.; the ratio by weight of the first constituent to the second constituent being within the range of 1:5 to 3:1 and the ratio of the combined weights of the first and second constituents to the third constituent being within the range of 1:5 to 2:1.

2. A composition according to claim 1, in which the mixture of the three constituents has an ASTM congealing point not greater than 145° F., a Saybolt Universal viscosity at 180° F. of not more than 55 seconds, a tensile strength at 40° F. of not less than 260 pounds per square inch, a tensile energy at 40°F. of not less than 3.0 inch-pounds per square inch, a consistometer hardness at 90° F. of 22–35 Abraham units and at 40°F. of 60–80 Abraham units, an ASTM union colorimeter color of not more than 1½, and an ASTM oil content of not more than 0.8%.

3. A composition according to claim 1, in which the mixture of the three constituents has an ASTM congealing point of about 137° F., a Saybolt Universal viscosity at 180° F. of about 47 seconds, a tensile strength at 40° F. of about 447 pounds per square inch, and a consistometer hardness at 90° F. of about 31.5 Abraham units and at 40° F. of about 76.0 Abraham units.

4. A wax composition consisting essentially of a mixture of three hydrocarbon constituents, the first of which consists of about 65–85% by weight of a non-straight chain paraffinic wax and has an average molecular weight in the range of about 550–750, a melting point by cooling curve of from about 150° F. to about 180° F., a Saybolt Universal viscosity at 210° F. of about 80–120 seconds, and an oil content of up to about 3.0%; the second of said constituents being comprised of about 50–95% by weight of a straight-chain paraffinic wax and containing about 5–50% by weight of a non-straight chain paraffinic wax material, and having an average molecular weight in the range of about 400–550, a melting point by cooling curve of from about 145° F. to about 165° F., a Saybolt Universal viscosity at 180° F. of about 45–65 seconds, and an oil content of up to about 2.0%; the third of said constituents consisting of at least about 90% by weight of a straight-chain paraffinic wax and having an average molecular weight in the range of about 290–340, a melting point by cooling curve of from about 115° F. to about 135° F., a Saybolt Universal viscosity at 180° F. of about 37–41 seconds, and an oil content of up to about 0.5%; the ratio by weight of the first constituent to the second constituent being within the range of 1:5 to 3:1, and the ratio of the combined weights of the first and second constituents to the third constituent being within the range of 1:5 to 2:1; said composition having a tensile strength at 40° F. of not less than 260 pounds per square inch, a consistometer hardness at 90° F. of 22–35 Abraham units and at 40° F. of 60–80 Abraham units, and an ASTM union colorimeter color of not more than 1½.

5. A wax composition consisting essentially of a mixture of three hydrocarbon constituents, the first of which is obtained from a partially refined topped petrolatum of which not more than 20% by volume distills below 650° F. at 10 mm. Hg, and which consists of about 65–85% by weight of a non-straight chain paraffinic wax and has an average molecular weight in the range of about 550–750, an ASTM congealing point of from about 150° F. to about 180° F., and a Saybolt Universal viscosity at 210° F. of about 80–120 seconds; the second of said constituents being a phenol treated, solvent dewaxed, motor oil petrolatum which has been solvent deoiled at 25–30° F. and then fractionated by distillation to give a 10–90% boiling range of from 40–120° F. at 10 mm. Hg, and is comprised of about 50–95% by weight of a straight-chain paraffinic wax and contains about 5–50% by weight of a non-straight chain paraffinic wax and has an average molecular weight in the range of about 400–550, an ASTM congealing point of from about 145° F. to about 165° F., and a Saybolt Universal viscosity at 180° F. of about 45–65 seconds; the third of said constituents being a refined product produced from a San Joaquin waxy-oil distillate having a 10–90% boiling range of from 20 to 120° F. at 10 mm. Hg, and having a molecular weight in the range of about 290–340, an ASTM congealing point of from about 115° F. to about 135° F., and a Saybolt Universal viscosity at 180° F. of about 37–41 seconds; the ratio by weight of the first constituent to the second constituent being within the range of 1:5 to 3:1, and the ratio of the combined weights of the first and second constituents to the third constituent being within the range of 1:5 to 2:1; said composition having a tensile strength at 40° F. of not less than 260 pounds per square inch, a consistometer hardness at 90° F. of 22–35 Abraham units and at 40° F. of 60–80 Abraham units, and an oil content of not more than 0.8%.

6. A wax composition consisting essentially of a mixture of three hydrocarbon constituents, the first of which is obtained from a partially refined topped petrolatum of which not more than 20% by volume distills below 650° F. at 10 mm. Hg, and which consists of about 65–85% by weight of a non-straight chain paraffinic wax and has an average molecular weight in the range of about 550–750, a melting point by cooling curve of from about 150° F. to about 180° F., and an oil content of up to about 3.0%; the second of said constituents being a phenol treated, solvent dewaxed, motor oil petrolatum which has been solvent deoiled at 25–30° F. and then fractionated by distillation to give a 10–90% boiling range of from 40–120° F. at 10 mm. Hg, and is comprised of about 50–95% by weight of a straight-chain paraffinic wax and contains about 5–50% by weight of a non-straight chain paraffinic wax and has an average molecular weight in the range of about 400–550, a melting point by cooling curve of from about 145° F. to about 165° F., and an oil content of up to about 2.0%; the third of said constituents being a refined product produced from a San Joaquin waxy-oil distillate having a 10–90% boiling range of from 20 to 120° F. at 10 mm. Hg, and having a molecular weight in the range of about 290–340, a melting point by cooling curve of from about 115° F. to about 135° F., and an oil content of up to about 0.5%; the ratio by weight of the first constituent to the second constituent being within the range of 1:5 to 3:1, and the ratio of the combined weights of the first and second constituents to the third constituent being within the range of 1:5 to 2:1; said composition having a Saybolt Universal viscosity at 180° F. of not more than 55 seconds, an ASTM congealing point of not more than 145° F., and a tensile energy at 40° F. of not less than 3 pounds per square inch.

7. A wax composition consisting essentially of a mixture of three hydrocarbon constituents, the first of which consists of about 65–85% by weight of a non-straight chain paraffinic wax and has an average molecular weight in the range of about 550–750, a Saybolt Universal viscosity at 210° F. of about 80–120 seconds, and a melting point by cooling curve of from about 150° F. to about 180° F.; the second of said constituents being comprised of about 50–95% by weight of a straight-chain paraffinic wax and containing about 5–50% by weight of a non-straight chain paraffinic wax and having an average molecular weight in the range of about 400–550, a Saybolt Universal viscosity at 180° F. of about 45–65 seconds, and a melting point by cooling curve of from about 145° F. to about 165° F.; and the third of said constituents consisting of at least about 90% by weight of a straight-chain paraffinic wax and having an average molecular weight in the range of about 290–340, a Saybolt Universal viscosity at 180° F. of about 37–41 seconds, and a melting point by cooling curve of from about 115° F. to about 135° F.; the ratio by weight of the first constituent to the second constituent being within the range of 1:5 to 3:1 and the ratio of the combined weights of the first and second constituents to the third constituent being within the range of 1:5 to 2:1; said composition having a tensile strength at 40° F. of not less than 260 pounds per square inch, a tensile energy at 40° F. of not less than 3 pounds per square inch, and a Saybolt Universal viscosity at 180° F. of not more than 55 seconds.

8. A wax composition consisting essentially of a mixture of three hydrocarbon constituents, the first of which consists of about 65–85% by weight of a non-straight chain paraffinic wax and has an average molecular weight in the range of about 550–750, a Saybolt Universal viscosity at 210° F. of about 80–120 seconds, an oil content of up to about 3.0%, and a melting point by cooling curve of from about 150° F. to about 180° F.; the second of said constituents being comprised of about 50–95% by weight of a straight-chain paraffinic wax and containing about 5–50% by weight of a non-straight chain paraffinic wax and having an average molecular weight in the range of about 400–550, a Saybolt Universal viscosity at 180° F. of about 45–65 seconds, an oil content of up to about 2.0%, and a melting point by cooling curve of from about 145° F. to about 165° F.; and the third of said constituents consisting of at least about 95% by weight of a straight-chain paraffinic wax and having an average molecular weight in the range of about 290–340, a Saybolt Universal viscosity at 180° F. of about 37–41 seconds, an oil content of up to about 0.5%, and a melting point by cooling curve of from about 115° F. to about 135° F.; the ratio by weight of the first constituent to the second constituent being about 2:3 and the ratio of the combined weights of the first and second constituents to the third constituent being about 3:2.

9. A container for packaging citrus juices, partially or wholly liquid dairy products and the like, coated with the composition of claim 1.

10. A container for packaging citrus juices, partially or wholly liquid dairy products and the like, said container being constructed of paper, paper board, or other fibrous material and being coated with a tough, non-flaking wax composition, the latter consisting essentially of a mixture of three hydrocarbon constituents; the first of which is obtained from a partially refined topped petrolatum of which not more than 20% by volume distills below 650° F. at 10 mm. Hg, and which consists of about 65–85% by weight of a non-straight chain paraffinic wax and has an average molecular weight in the range of about 550–750, a Saybolt Universal viscosity at 210° F. of about 80–120 seconds, an oil content of up to about 3.0%; the second of said constituents being a phenol treated, solvent dewaxed, motor oil petrolatum which has been solvent deoiled at 25–30° F. and fractionated by distillation to give a 10–90% boiling range of from 40 to 120° F. at 10 mm. Hg and is comprised of about 50–95% by weight of a straight-chain paraffinic wax and contains about 5–50% by weight of a non-straight chain paraffinic wax and has an average molecular weight in the range of about 400–550, a Saybolt Universal viscosity at 180° F. of about 45–65 seconds, an oil content of up to about 2.0%; and the third of said constituents being a refined product, produced from a San Joaquin waxy-oil distillate, having a 10–90% boiling range of from 20 to 120° F. at 10 mm. Hg and having a molecular weight in the range of about 290–340, a Saybolt Universal viscosity at 180° F. of about 37–41 seconds, an oil content of up to about 0.5%; the ratio by weight of the first constituent to the second constituent being within the range of 1:5 to 3:1, and the ratio of the combined weights of the first and second constituents to the third constituent being within the range of 1:5 to 2:1; said composition having a tensile strength at 40° F. of not less than 260 pounds per square inch, an oil content of not more than 0.8%, and a consistometer hardness at 90° F. of 22–35 Abraham units and at 40° F. of 60–80 Abraham units.

11. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, and a consistometer hardness of 22–35 Abraham units at 90° F. and 60–80 Abraham units at 40° F.

12. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, a consistometer hardness of 22–35 Abraham units at 90° F. and 60–80 Abraham units at 40° F., a Saybolt viscosity at 180° F. of not over 55 SUS and a tensile strength at 40° F. of not less than 260 p.s.i.

13. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, a consistometer hardness of 22–35 Abraham units at 90° F. and 60–80 Abraham units at 40° F., and a tensile strength at 40° F. of not less than 260 p.s.i.

14. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, a consistometer hardness of 22–35 Abraham units at 90° F. and 60–80 Abraham units at 40° F., and a tensile energy at 40° F. of not less than 3.0 inch-pounds per square inch.

15. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, a consistometer hardness of 22–35 Abraham units at 90° F. and 60–80 Abraham units at 40° F., and having a color not over 1½ on an ASTM union colorimeter.

16. A hydrocarbon wax composition derived from petroleum consisting essentially of a mixture of from about 46% to about 97% of straight chain paraffinic wax, the remainder being a non-straight chain paraffinic wax, said composition having a boiling point distillation curve falling within the area defined by and including curves M$x$ and M$n$ of Fig. 5, a melting point solidification curve falling within the area defined by and including curves M'$x$ and M'$n$ of Fig. 7, an ASTM oil content of not over 0.8%, a consistometer hardness of 22–35 Abraham units at 90° F. and 60–80 Abraham units at 40° F., a Saybolt viscosity at 180° F. of not over 55 SUS, a tensile strength at 40° F. of not less than 260 p.s.i., and having a color not over 1½ on an ASTM union colorimeter.

References Cited in the file of this patent

UNITED STATES PATENTS

| | | |
|---|---|---|
| 2,670,323 | Hunter | Feb. 23, 1954 |
| 2,758,100 | Bailey | Aug. 7, 1956 |
| 2,773,812 | Fench | Dec. 11, 1956 |
| 2,780,556 | Schaerer | Feb. 5, 1957 |
| 2,842,483 | Pethrick | July 8, 1958 |
| 2,846,375 | Annable | Aug. 5, 1958 |